Aug. 1, 1933.  A. G. F. WALLGREN  1,920,727
BEARING
Filed March 1, 1932    3 Sheets-Sheet 1

INVENTOR
BY
ATTORNEY

Aug. 1, 1933.  A. G. F. WALLGREN  1,920,727
BEARING
Filed March 1, 1932   3 Sheets-Sheet 2

INVENTOR
August Gunnar Ferdinand Wallgren
BY
ATTORNEY

Aug. 1, 1933.    A. G. F. WALLGREN    1,920,727
BEARING
Filed March 1, 1932    3 Sheets-Sheet 3
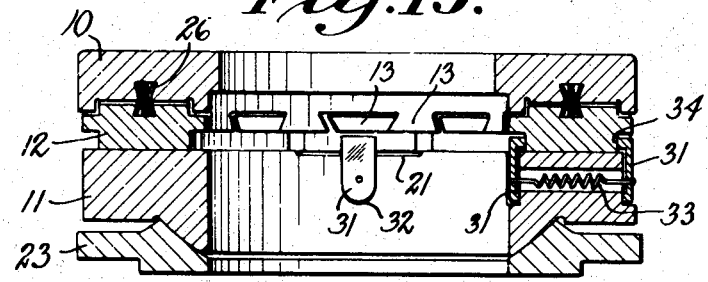
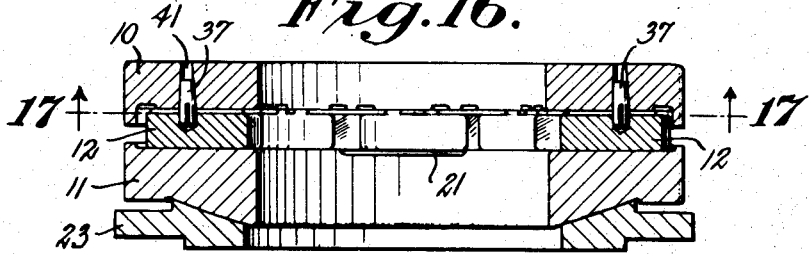
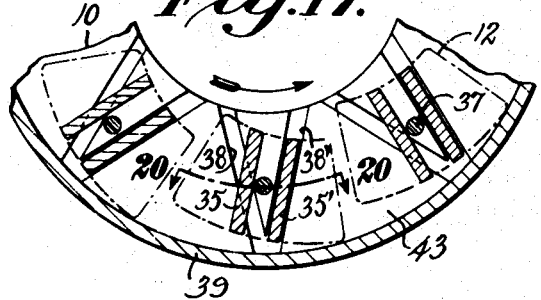
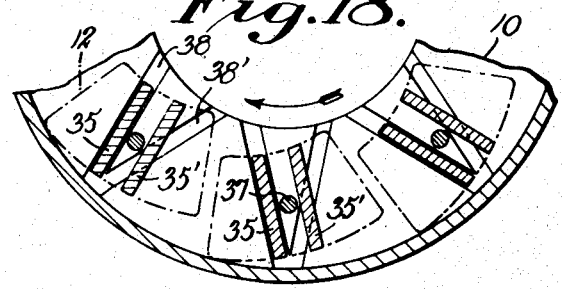
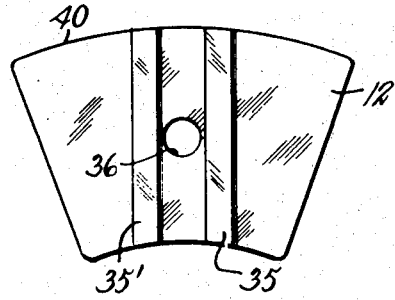
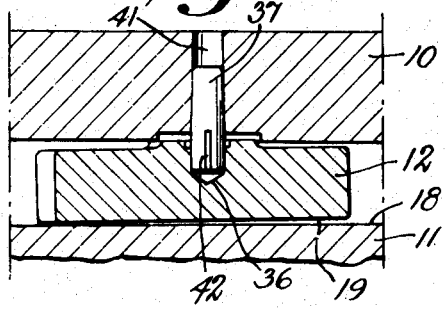
INVENTOR
August Gunnar Ludwig Wallgren
BY
ATTORNEY Patented Aug. 1, 1933

1,920,727

UNITED STATES PATENT OFFICE 1,920,727

BEARING

August Gunnar Ferdinand Wallgren, Stockholm, Sweden, assignor to Aktiebolaget Nomy, Stockholm, Sweden, a Corporation of Sweden Application March 1, 1932, Serial No. 596,045, and in Sweden March 6, 1931

15 Claims. (Cl. 308—160)

The present invention relates to axial thrust bearings and has particular reference to bearings of this type in which bearing blocks are arranged to provide, in normal operation of the bearing, wedge shaped spaces between the bearing blocks and one of the bearing members, which spaces are filled by load sustaining films of lubricant. Still more particularly, the invention relates to bearings of the above mentioned character which are capable of operation in reverse directions of rotation.

In the art as heretofore developed, bearings of the above general type have been provided in which bearing blocks, through the medium of auxiliary elements such as rollers, balls or the like, are caused to change their position with respect to the bearing members upon reversal of the direction of rotation of the bearing.

The principal object of the present invention is to improve upon prior forms of construction and to provide a bearing of the character described in which the blocks are caused to shift position in a direct manner, upon reversal of direction of rotation, instead of indirectly and through the influence of auxiliary bearing parts. This general object is attained, in accordance with the present invention, by providing a bearing the arrangement of the parts of which is such that the bearing blocks at certain times pass into unloaded zones which permit of the desired shifting of the blocks when the direction of rotation of the bearing is reversed.

Further and more detailed objects of the invention and the manner in which these objects are attained will become apparent from the following description of preferred embodiments of the invention illustrated in the accompanying drawings forming a part of this specification.

In the drawings:

Fig. 15 is a view similar to Fig. 2 showing still another form of bearing embodying the invention;

Fig. 16 is a view similar to Fig. 2 showing still another form of the invention;

Figs. 17 and 18 are views taken on the line 17—17 of Fig. 16 showing the bearing blocks in the positions assumed thereby when the directions of rotation of the bearing are as indicated by the arrows in the respective figures;

Fig. 19 is a plan view of one of the blocks in the bearing shown in Fig. 16, and, Fig. 20 is a section on enlarged scale taken on the line 20—20 of Fig. 17.

Figure 1:
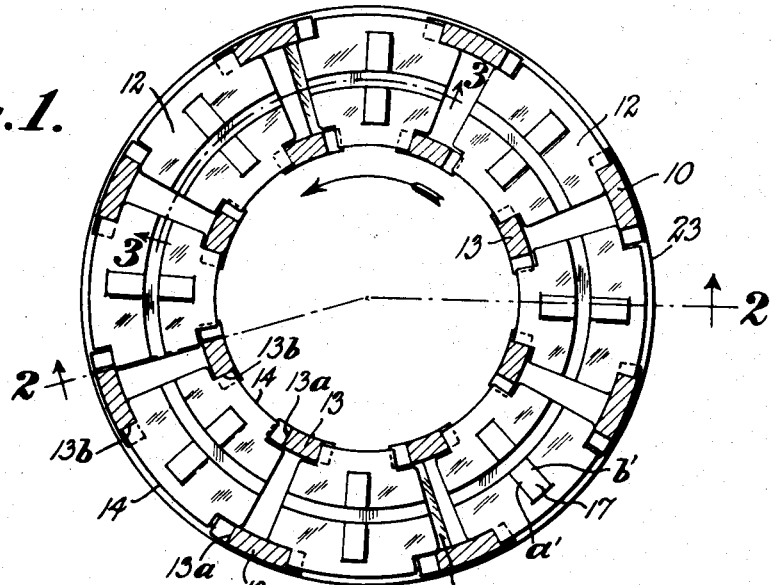
Fig. 1 is a transverse section of a bearing embodying the invention, taken along the line 1—1 of Fig. 2.

Turning now more particularly to Fig. 1 and related figures, the bearing comprises axially spaced bearing members or rings 10 and 11 between which are situated a plurality of bearing blocks 12. Bearing member 10, which is intended to be secured to the shaft with which the bearing is associated, is provided with a plurality of axially extending projections 13. These projections are peripherally and radially spaced, as will be observed from Fig. 1. Projections 13 provide a plurality of abutment surfaces 13a and 13b. Blocks 12 are each provided at their radially inner and outer sides with projections 14 adapted, when the blocks are in operative position, to be received between peripherally adjacent projections 13. The abutment surfaces 13a or 13b, depending upon the direction of rotation of the member 10, engage the end surfaces of the projections 14 to cause the blocks to rotate with this ring. From Fig. 1 it will be observed that the projections 13 provide guides for holding the blocks in proper position radially. It will be evident that ring 10 is in the nature of a carrier ring for blocks 12 and this element will hereinafter be referred to as a carrier ring.

Figure 3:
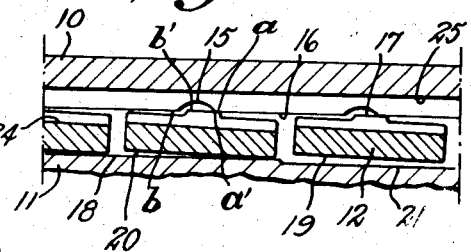
Fig. 3 is a section taken along the line 3—3 of Fig. 1.

The carrier ring 10 is provided with a plurality of radially extending depressions in the form of grooves 15 (see Fig. 3) and intermediate these grooves, the face of the ring provides a series of plane surfaces 16. Adjacent to the edges of the grooves 15, the surfaces 16 provide shoulders or tilting surfaces $a$ and $b$. Each of the blocks is provided with a radially extending centrally disposed projection 17, the edges of which provide surfaces $a'$ and $b'$ adapted to alternatively engage, respectively, the surfaces $a$ and $b$.

As will be observed from Fig. 1, the peripheral extent of the projections 14 on blocks 12 is less than the peripheral space between the projections 13 adjacent to the respective projections 14, thus permitting a limited peripheral movement of the blocks with respect to the carrier ring.

Figure 4:
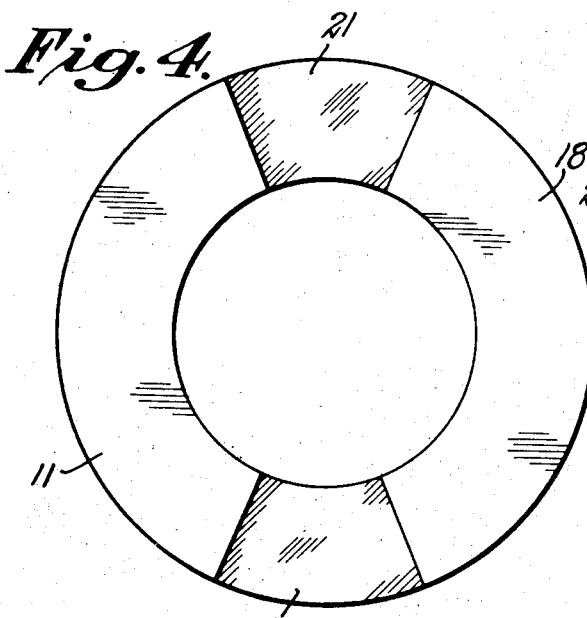
Fig. 4 is an elevation taken along the line 4—4 of Fig. 2 and showing the bearing surface of one of the bearing members.

The ring element 11 associated with the stationary part of the bearing is provided with a plane surface 18 with respect to which surface, the plane surfaces 19 of the blocks are adapted to slide. Between surfaces 18 and 19, a series of wedge shaped spaces 20 are formed, which spaces receive the load sustaining film of lubricant. Ring 11 is further provided, in accordance with the present invention, with recesses the peripheral extent of which is somewhat greater than the peripheral extent of the blocks 12. As will be seen from Fig. 4, two diametrically opposed recesses 21 are provided in the present embodiment. The number, form and size of the recesses in the stationary bearing ring may vary within the scope of the invention.

Figure 2:
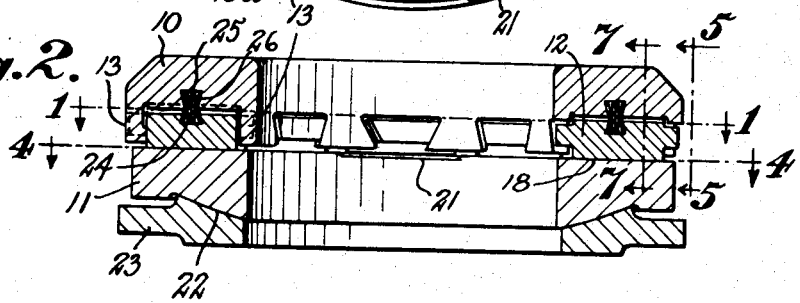
Fig. 2 is an axial section taken along the line 2—2 of Fig. 1.

The present form of bearing is of the self-aligning type and in order to give the desired self-aligning property, the ring 11 is provided with a spherically curved surface 22 on the side opposite the surface 18. This spherically curved surface engages a complementary surface on the ring 23, the latter ring being adapted to be rigidly secured to the supporting structure. It will be evident from Fig. 2 that, due to the spherically curved surface 22, the entire bearing assembly may shift to compensate for mis-alignment or curvature of the shaft, without disturbing the proper relationship between the bearing rings and blocks. The bearing blocks 12 are provided with peripherally extending grooves 24 in the faces opposite the faces providing the surfaces 19. These grooves, as will be seen from Fig. 2, are undercut and in the specific form illustrated, are of dove-tail cross-section. The carrier ring 10 is provided with a peripheral groove 25 adapted to register with grooves 24 when the blocks are in operative position.

Figures 9, 10:
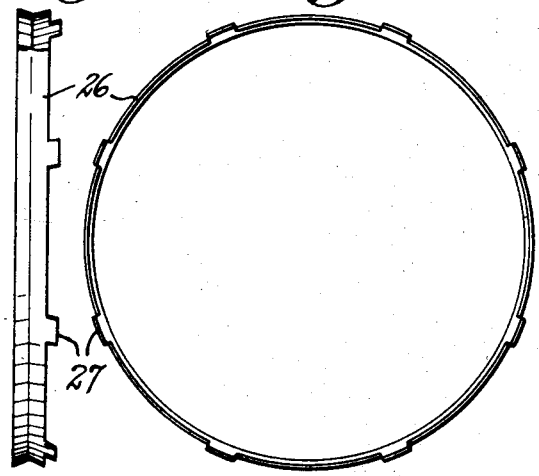
Figs. 9 and 10 are end and side elevation views, respectively, of a ring element of the bearing.
Figures 11, 12:
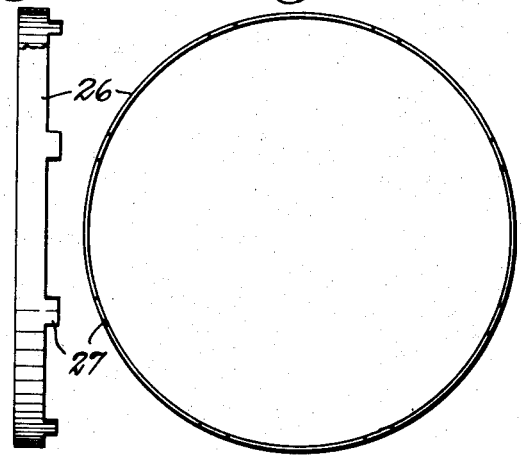
Figs. 11 and 12 are end and side elevations, respectively, of another ring element of the bearing.

Situated in grooves 24 and 25 are a plurality of retaining rings 26 (see Figs. 9-12) having thereon peripherally spaced sets of axially extending projections 27. In the present form of bearing, eight bearing blocks are employed and these blocks are connected in pairs by means of rings 26, against peripheral displacement with respect to each other. Thus, there are four rings 26, each ring connecting, in the form of bearing illustrated, two diametrically opposed bearing blocks 12. One bearing block is retained between each pair of projections 27. Preferably, the rings are made in the form illustrated in the figures, two of the rings being cylindrical, as shown in Figs. 11 and 12 and two of the rings being dished, as shown in Figs. 9 and 10. As shown in Fig. 2, the retaining rings are placed in the grooves 24 and 25 with the two plane cylindrical rings between the two dished rings, the latter rings engaging the undercut sides of the grooves to retain the assembly in position. In this connection it is to be noted that the peripheral distance between the projections 27 forming each pair is sufficient to allow a slight amount of play of the blocks with respect to the projections, whereby to permit the blocks to have sufficient movement to assume their proper operating positions. It is further to be noted that the thickness of the retaining rings, with respect to the width of the grooves 25, is such that the rings are not held gripped tightly in this groove but are sufficiently loose to permit peripheral movement of the retaining rings with respect to the carrier ring 10.

The operation of the above described bearing is as follows. If the shaft and carrier ring are rotated in the direction indicated by the arrows in Figs. 1 and 5, the blocks will shift peripherally, with respect to the carrier ring, to the positions shown in these figures, with the ends of the projections 14 abutting the abutment surfaces 13$b$ on the projections 13. With the blocks in this position, the supporting surfaces $a$ and $a'$ will cooperate to transmit load from the carrier ring to the block (or vice versa) and the supporting surfaces $b'$ of the blocks will project into the depressions formed by the grooves 15. As will be evident from Fig. 5, the blocks, when in this position, are eccentrically supported with respect to their peripheral length and are thereby caused to tilt in the manner indicated in this figure so that a wedge shaped space 20 is formed under each of the blocks, the axial width of the space increasing in the direction of rotation of the blocks.

For the bearing to function properly, it is necessary for the blocks to tilt so that the wedge shaped spaces are formed with the greatest axial extent of the spaces at the forward ends of the blocks, considered in the direction of rotation thereof. In order for the wedge shaped spaces to be formed in the proper manner, regardless of the direction of rotation of the bearing, the bearing is provided with what may be termed unloaded zones, due, in the present embodiment, to the presence of the recesses 21 in the stationary bearing member 11. If, for example, the direction of rotation of the bearing is reversed, with the blocks in the position shown in Fig. 5, the blocks may move for a short distance tilted in the wrong direction. However, very little movement of any one block from any position in which it may be when reversal takes place is sufficient to bring the block into an unloaded zone provided by one of the recesses 21. As soon as the block enters the unloaded zone, it is permitted to shift from the position shown, for example in Fig. 5, to the position shown in Fig. 6, assuming the direction of rotation to have been changed from that indicated in Fig. 5 to that indicated in Fig. 6. Peripheral shifting of each block as it reaches the unloaded zone, is caused by frictional resistance to movement of the block with respect to the member 11. Load is transmitted between each block and the carrier ring by the co-acting surfaces $b$ and $b'$, the end surfaces of the projections 14 of each of the blocks being in abutting relation with the respectively co-acting abutment surfaces 13$a$ on the carrier ring. In the position of the blocks indicated in Fig. 6, with the surfaces $b$ and $b'$ in contact, the surfaces $a'$ project into the recesses formed by the depressions 15. Upon reversal of the bearing, some peripheral movement of the blocks with respect to the carrier ring may occur, before the blocks reach the unloaded zone. The blocks may, for example, be in a position such that both surfaces $a$ and $a'$ and $b$ and $b'$ are in contacting relation. The passage of the blocks into an unloaded zone, however, insures shifting of the blocks to proper operating position, regardless of the direction of rotation.

As has previously been pointed out, the unloaded zones in the present form of bearing are diametrically opposed and when the unloaded zones are so situated with respect to each other, the retaining rings 26 should be of the form indicated, in which diametrically opposed blocks are held by the same ring against peripheral displacement with respect to each other. With this arrangement, it will be apparent that two blocks engaged by the same retaining ring will move simultaneously into unloaded zones, thus permitting both of the blocks held by one retaining ring to shift peripherally with respect to the carrier ring without hindrance from any force imposed thereon by the retaining ring.

In the arrangement just described, the bearing blocks are adapted to rotate with the shaft and, in either direction of rotation thereof, the supporting surfaces $a$—$a'$ or $b$—$b'$, which are in cooperative engagement, are situated behind the center line of the bearing blocks, having consideration for the direction of rotation. If, on the other hand, the bearing blocks are associated with the stationary part of the bearing rather than with the rotating part of the bearing, the point of support for the bearing blocks, in order to secure proper formation of the desired wedge shaped spaces, must be in front of rather than behind the mid points of the respective bearing blocks, considered in the direction of rotation of the moving parts of the bearing.

Figure 5:
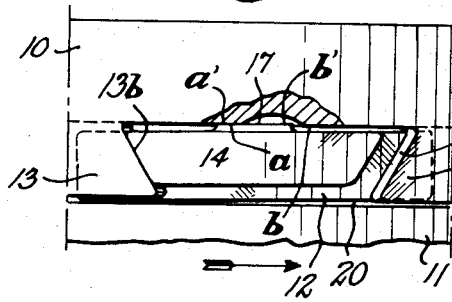
Fig. 5 is an elevation, partly in section and on an enlarged scale, of a part of the bearing shown in Fig. 2 as viewed from the line 5—5 of Fig. 2.
Figure 6:
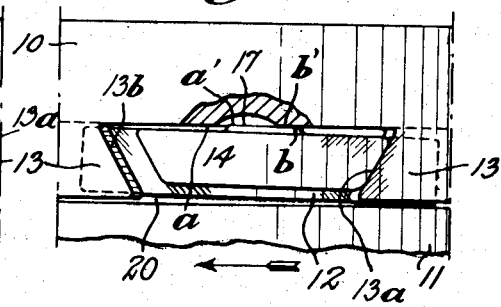
Fig. 6 is a view similar to Fig. 5, showing a bearing block adjusted for a direction of rotation opposite to that shown in Fig. 5.
Figure 7:
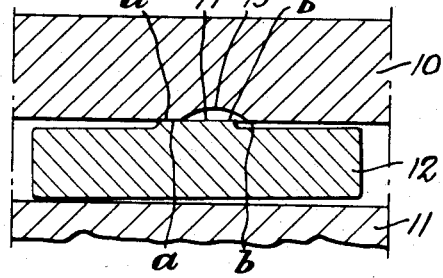
Fig. 7 is a section on enlarged scale of a part of the bearing, taken on the line 7—7 of Fig. 2.
Figure 8:
Fig. 8 shows one of the bearing blocks in elevation.

As will be evident from Figs. 5 and 6, the abutment surfaces 13$a$ and 13$b$ are advantageously disposed angularly with respect to axial lines and preferably are so disposed that these abutment surfaces, if plane, coincide with chords of arcs the centers of which coincide with the bearing surfaces adjacent the respect abutment surfaces. Thus, for example, in Fig. 5, the abutment surface 13$b$ is advantageously, if plane, coincident with a chord of an arc drawn about the surface $a$ as a center, while the abutment surface 13$a$ coincides with a chord of a similar arc struck about $b$ as a center. The abutment surfaces 13$a$ and 13$b$ and the cooperating end surfaces of the projections 14 on the blocks 12 may be arcuate and advantageously such arcuate surfaces coincide with arcs struck about the respective centers $b$ and $a$.

With the abutment surfaces arranged in this manner, movement of the blocks to different degrees of tilt with respect to the bearing member 11, are effected with the minimum relative peripheral movement between surfaces $a$—$a'$ or $b$—$b'$, as the case may be. This reduces wear on these surfaces to a negligible amount.

The retaining rings 26 have a dual function. In the first place, these rings prevent the bearing blocks from falling out of the bearing in case of disassembly. Secondly, they prevent the bearing blocks from assuming incorrect positions. As will be evident from Fig. 2, the individual blocks are retained in assembled relation with respect to the carrier ring due to the dished form of the outer rings 26. These rings are advantageously made of elastic material so that the blocks may be attached or removed by snapping them on or off these resilient rings. The retaining rings operate to prevent the blocks from assuming incorrect positions due to the interconnection, by means of each ring, of opposed blocks. The manner in which this is effected is as follows. Suppose that the bearing is associated with a horizontally arranged shaft so that the faces of the bearing members are vertical, and that the direction of rotation of the shaft is as indicated by the arrow in Fig. 1. Under these conditions, the bearing blocks as they move downwardly (on the left hand side of Fig. 1) are in a position such that surfaces $a$ and $a'$ are in contact, these surfaces being above the center of gravity of the blocks. As each successive block passes into the unloaded zone provided by the recess 21 at the left hand side of Fig. 4, the tendency of the block is to shift its position, due to gravity, so that surfaces $b$ and $b'$ are in contact and the lower end of the projections 14 of the block are in contact with the adjacent abutment surfaces 13$a$. If this occurred, each block, after passing the unloaded zone, would enter the next loaded zone tilted in the wrong direction. The above undesirable shifting of the blocks is prevented due to the interconnection of two opposed blocks. Frictional forces tend to keep the blocks in their proper position and with two diametrically opposed blocks held against relative rotational movement with respect to each other by the retaining rings, the tendency of any block passing into the unloaded zone at the left hand side of the bearing to drop due to gravity is counterbalanced by the weight of the oppositely disposed bearing block held by the same retaining ring, which latter block is acted upon by gravity to retain it in its proper position. Since the frictional resistance on all blocks tends to maintain them in proper position and, since the forces of gravity tending to shift the blocks from proper position are neutralized, the blocks are retained, during their passage through the unloaded zone, in their proper positions with respect to the carrier ring.

Figure 14:
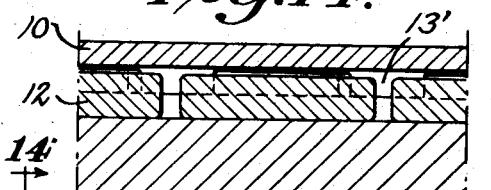
Fig. 14 is a section taken on the line 14—14 of Fig. 13.
Figure 13:
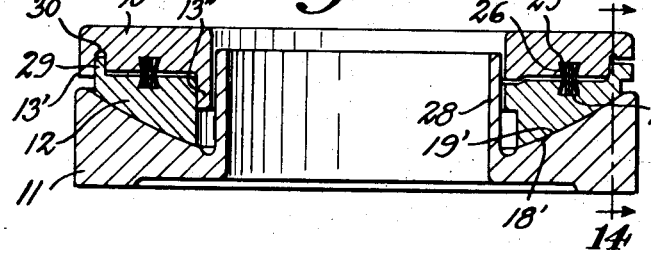
Fig. 13 is a view similar to Fig. 2 showing a different form of bearing embodying the invention.

Turning now to the form of bearing illustrated in Figs. 13 and 14, the same general principle of construction employed in the form already described is made use of. In the present form, however, the relatively sliding surfaces 18' and 19' of the stationary ring and of the blocks are made spherical instead of plane. The surface 18' is interrupted by recesses, for the purpose of providing unloaded zones, in the manner which has already been described in connection with the form of bearing shown in Fig. 1. The bearing member 11 preferably has a sleeve-like extension 28 which with the curved surface 18' provides an annular well-like space for the retention of lubricant.

The carrier ring has peripherally spaced axially extending projections 13' and 13'' which provide abutment surfaces co-acting with the projections 14 on the blocks to carry the blocks with the carrier ring in the manner already described. Due to the spherically curved formation of the relatively sliding surfaces 18' and 19', the projections 13' and 13'' and the projections 14 on the blocks cooperating therewith are offset axially of the bearing as indicated in Fig. 13. For radial guidance of the blocks, they are preferably provided with peripherally extending cam-like projections or flanges 29 which project axially into a peripherally extending groove 30 in the carrier ring.

The blocks and carrier ring are further provided with grooves 24 and 25 for the reception of the retaining rings 26, which rings may be of the form already described.

Fig. 15 illustrates another embodiment of the invention employing friction members for causing shifting movement of the blocks with respect to the carrier ring. In this embodiment, the bearing member or ring 11 is provided with fingers 31 situated in suitable recesses 32 in the ring adjacent to the unloaded zones provided by the recesses 21. Fingers 31 are preferably resiliently held in position by springs 33 connecting these fingers in pairs and the fingers are further advantageously provided with flanges 34 turned toward the bearing blocks and adapted to frictionally engage the sides thereof as the blocks pass the fingers. It will be evident that the friction provided by contact of the blocks with these fingers will assist in effecting the desired shift of position of the blocks upon reversal of the direction of rotation of the bearing. It will further be evident that, with the frictional resistance provided by these fingers at the unloaded zones, the tendency of the blocks to shift to the wrong position, under certain conditions of operation, will be taken care of. Consequently, the retaining rings 26 need not be depended upon to fulfill this function and may be made without the projecting pairs of projections 27 for holding pairs of blocks against relative rotation with respect to each other.

As will be apparent from the nature of the bearing, as indicated in Fig. 15, the remaining features of construction thereof may be similar to the bearing shown in Fig. 1.

Figs. 16 to 20 illustrate the application of the invention to another form of bearing in which the bearing blocks shift position, upon reversal of direction of rotation, by pivoting around retaining pins associated with the blocks and the carrier ring. In this form of the bearing, each of the blocks is provided with spaced projections 35 and 35', which projections provide the supporting surfaces for the blocks. Between these projections, the blocks are provided with axially extending cylindrical recesses 36 in which are situated the pivot pins 37. The carrier ring is provided with grooves 38 and 38' adapted to cooperate respectively with projections 35 and 35' in different positions of the blocks. In the bearing illustrated, the projections 35 and 35' are parallel to each other and the grooves 38 and 38' for each block are angularly disposed with respect to each other (see Figs. 17 and 18). The angle through which the bearing blocks can turn around their respective pivot pins is limited by a circumferential flange 39 on the carrier ring, which flange projects in axial direction so as to be capable of engaging the radially outer sides 40 of the blocks.

The pivot pins 37, which are seated in suitable holes 41 in the carrier ring, are preferably bifurcated as at 42 to permit attachment and removal of the blocks and furthermore, are fitted in the recesses 36 in the blocks with sufficient play to permit the blocks to assume their proper tilted positions.

When the bearing rotates in the direction indicated by the arrow in Fig. 17, the blocks will adjust themselves to the position shown by dot-and-dash lines in this figure, that is, the blocks will turn until the forward ends of the sides 40 (considered in the direction of rotation) abut against the flange 39. When the blocks are turned to this position, the projections 35 on the blocks are situated angularly with respect to the grooves 38, while the projections 35' will be parallel with and opposite, or in other words, in registry with, the grooves 38'. The projections 35 will thus rest on the supporting surface provided by the face 43 of the carrier ring situated between the grooves while the projections 35' will be free to enter the depressions formed by the grooves 38'. The area of contact between each block and the carrier ring, as will be evident from Fig. 15, is thus behind the center of the block, considered in the direction of rotation, and each block will therefore be caused to tilt on rotation in the manner already described, tilting being permitted by the entry of the respective projections 35' into the depressions in registry therewith.

Upon reversal of direction of rotation to a direction as indicated by the arrow in Fig. 18, the blocks will pivot to the position shown in dot-and-dash lines in this figure. In this position the projections 35' are angularly disposed with respect to the depressions 38' while the projections 35 are in registry with the depressions 38. From the foregoing description, it will be apparent that with the blocks shifted to the position shown in Fig. 18, they are in contact with the carrier ring by virtue of contacting surfaces situated behind the centers of the blocks, considered in the direction of rotation, and will accordingly be tilted in the proper manner.

The blocks shift from one position to the other upon passing through unloaded zones, which zones are provided for in the same manner as previously described in connection with the other embodiments. Turning movement of the blocks about their pivots is caused by friction between the blocks and the surface on the stationary ring 11 with respect to which the blocks slide. The manner in which friction acts to cause shifting of the blocks about their pivot pins will be apparent from a consideration of Fig. 17. It will be evident from this figure that friction between the surface 18 on ring 11 and that portion of the surface 19 on each block which is radially outside of the pivot pin 37 will produce a turning moment tending to shift the block in a clockwise direction, as viewed in this figure. Similarly, friction between surface 18 and that portion of the surface 19 of each block lying radially inside the pivot pin 37 will produce a turning moment tending to shift the block in counter-clockwise direction. Due, however, to the fact that the peripheral speed of the outer portions of the blocks is greater than the peripheral speed of the inner portions of the blocks, the value of the frictional force per unit of contacting area is greater at the outer portions of the blocks than at the inner portions of the blocks. Therefore, assuming the pivot pins to be centrally located, the turning moment exerted on each block in clockwise direction is greater than the turning moment exerted in counter-clockwise direction and the blocks are accordingly shifted in clockwise direction to the position shown in Fig. 17. Upon reversal of the direction of rotation, the direction of the turning moments produced by frictional forces is reversed and a net turning moment is produced on each of the blocks acting to shift it in counter-clockwise direction to the position shown in Fig. 18. It will be evident that by suitably positioning the pins 37 with respect to the blocks, the value of the net turning moment tending to shift the blocks on reversal may be altered as desired.

If the pivot pins are placed at the center of gravity of the blocks, the net turning moment produced on the blocks on rotation of the bearing is sufficient to keep the blocks from assuming incorrect positions when they pass through the unloaded zones, even if the bearing is arranged so that the blocks rotate in a vertical plane and is rotated at slow speed.

The projections 35 and 35' on the blocks may be non-parallel, in which case the cooperating grooves 38 and 38' in the carrier ring will be disposed with respect to each other at angles different from those shown in Figs. 17 and 18. The angularity of the depressions 38 and 38' with respect to each other should be such, having regard to the angular relation of the projections 35 and 35', that when the blocks are in operative position, one or the other of the depressions will be in registry with its cooperating projection so as to permit proper tilting of the blocks.

From the foregoing description, it will be evident that the invention may be embodied in bearings of many different specific forms and the invention is accordingly not to be considered as being limited in its application to the specific embodiments hereinbefore described by way of example but is to be considered as embracing all devices falling within the scope of the appended claims when given the broadest interpretation consistent with the state of the prior art.

What I claim is:

1. A bearing of the character described comprising relatively rotatable bearing members, a plurality of bearing blocks having operative positions axially between said members, one of said members and said blocks having cooperating surfaces for causing rotation in one direction to tilt the blocks one way and rotation in the other direction to tilt the blocks the other way, means for permitting and limiting shift of position between said blocks and one of said members, and means providing an unloaded zone for facilitating said shift of position upon reversal of direction of rotation of the bearing.

2. A bearing of the character described comprising relatively rotatable bearing members, a plurality of bearing blocks having operative positions axially between said members, one of said members and said blocks having cooperating surfaces for causing rotation in one direction to tilt the blocks one way and rotation in the other direction to tilt the blocks the other way, means for permitting and limiting shift of position between said blocks and one of said members and means comprising a recess in the other of said members providing an unloaded zone for facilitating said shift of position upon reversal of direction of rotation of the bearing.

3. A bearing of the character described comprising a rotatable bearing member, a stationary bearing member, a plurality of bearing blocks having operative positions axially between said members, said rotatable member and said blocks having cooperating surfaces for causing rotation in one direction to tilt the blocks one way and rotation in the other direction to tilt the blocks the other way, and means for permitting and limiting shift of position between said blocks and said rotatable member, said stationary member and said blocks having cooperating relatively sliding surfaces and the sliding surface on said stationary member having a recess therein providing an unloaded zone for facilitating said shift of position upon reversal of direction of rotation.

4. A bearing of the character described comprising relatively rotatable bearing members, a plurality of bearing blocks having operative positions axially between said members, one of said members and said blocks having cooperating surfaces for causing rotation in one direction to tilt the blocks one way and rotation in the other direction to tilt the blocks the other way, means for permitting and limiting shift of position between said blocks and one of said members, and means comprising a plurality of peripherally spaced recesses in the other of said members providing unloaded zones for facilitating simultaneous shift of position of a plurality of said blocks upon reversal of direction of rotation.

5. A bearing of the character described comprising relatively rotatable bearing members, a plurality of bearing blocks having operative positions axially between said members, one of said members and said blocks having cooperating surfaces for causing rotation in one direction to tilt the blocks one way and rotation in the other direction to tilt the blocks the other way, means for permitting and limiting shift of position between said blocks and one of said members, means comprising diametrically opposed recesses in the other of said members providing unloaded zones facilitating shift of position of diametrically opposed blocks upon reversal of direction of rotation, and means cooperating with diametrically opposed blocks to prevent relative rotation thereof with respect to each other, whereby to prevent shift of position of one block without corresponding shift of position of a diametrically opposed block.

6. A bearing of the character described comprising spaced bearing members, a plurality of bearing blocks having operative positions axially between said members, said blocks and one of said members having cooperating surfaces for tilting the blocks and for carrying the blocks in rotation with said one member while permitting limited movement of the blocks relative to said one member, the other of said members being recessed to provide an unloaded zone for said blocks, each of said blocks being adapted in certain positions of the bearing to move from operative position due to its weight when in said unloaded zone, and means for preventing said last mentioned movement.

7. A bearing of the character described comprising spaced bearing members, a plurality of bearing blocks having operative positions axially between said members, said blocks and one of said members having cooperating surfaces for tilting the blocks and for carrying the blocks in rotation with said one member while permitting limited movement of the blocks relative to said one member, the other of said members being recessed to provide an unloaded zone for said blocks, each of said blocks being adapted in certain positions of the bearing to move from operative position due to its weight when in said unloaded zone, and means connecting any one of said blocks with another of said blocks to prevent such last mentioned movement.

8. A bearing of the character described comprising spaced bearing members, a plurality of bearing blocks having operative positions axially between said members, said blocks and one of said members having cooperating surfaces for tilting the blocks and for carrying the blocks in rotation with said one member while permitting limited movement of the blocks relative to said one member, the other of said members being recessed to provide an unloaded zone for said blocks, each of said blocks being adapted in certain positions of the bearing to move from operative position due to its weight when in said unloaded zone, and retaining elements connecting oppositely disposed blocks to prevent such last mentioned movement.

9. A bearing of the character described comprising spaced bearing members, a plurality of bearing blocks having operative positions axially between said members, each of said blocks having two bearing surfaces adapted to alternatively transmit load between the blocks and one of said members, said one of said members having depressions therein adapted to receive one of said surfaces while load is transmitted through the other surface and the other of said members having a recessed bearing surface providing an unloaded zone through which said blocks are adapted to pass.

10. A bearing of the character described comprising relatively rotatable axially spaced members and a plurality of bearing blocks having operative positions axially between said members, said blocks having portions adapted to be alternatively loaded and unloaded on reversal of direction of rotation, one of said members having depressions therein for receiving the unloaded portions of the blocks and having projections cooperating with the blocks for limiting movement of said blocks with respect thereto, said projections and depressions permitting and controlling movement of the blocks on reversal of direction of rotation to mate the unloaded portions with the depressions and the loaded portions with the surfaces with respect to which the depressions are formed, and the other of said members being recessed to provide an unloaded zone for said bearing blocks to facilitate movement of the blocks with respect to said one member on reversal of direction of rotation.

11. A bearing of the character described comprising axially spaced bearing members and a plurality of bearing blocks having operative positions axially between said members, one of said members and one face of each of said blocks having cooperating surfaces for causing rotation in one direction to tilt the blocks one way and rotation in the other direction to tilt the blocks the other way, the other one of said members and the opposite face of each of said blocks having surfaces adapted to slide relative to each other, and different portions of said surface on said other member being at axially different distances from the cooperating surfaces on said one of said members, whereby to provide an unloaded zone for said blocks in one or more positions thereof.

12. An axial thrust bearing of the type having sliding blocks comprising a bearing member having surface with respect to which the bearing blocks are adapted to slide in tilted position, said surface having a recess therein providing an unloaded zone through which the bearing blocks are adapted to pass.

13. An axial thrust bearing of the type having sliding blocks comprising a bearing member having surface with respect to which the bearing blocks are adapted to slide in tilted position, said surface having a recess therein and said recess having a radial extent at least as great as the radial extent of any one of the blocks and having a peripheral extent greater than the peripheral extent of any one of the blocks, whereby to provide an unloaded zone through which the blocks are adapted to pass.

14. An axial thrust bearing of the type having sliding blocks comprising a bearing member having surface with respect to which the bearing blocks are adapted to slide in tilted position, said surface having opposed recesses therein providing unloaded zones through which opposed bearing blocks are adapted to pass concurrently.

15. An axial thrust bearing comprising a stationary bearing member having an annular bearing surface, a rotatable carrier ring and a plurality of bearing blocks having operative positions axially between said bearing member and said carrier ring, said carrier ring and said blocks having cooperating surfaces for tilting the blocks and for carrying the blocks in rotation with the carrier ring while permitting shift of position relative to the carrier ring, said bearing blocks having other surfaces adapted to slide with respect to said annular bearing surface and said annular bearing surface being recessed to provide an unloaded zone for facilitating shift of position of said blocks relative to said carrier ring.

AUGUST GUNNAR FERDINAND WALLGREN.